(Model.)

A. FISHER.
NUT LOCK.

No. 325,829. Patented Sept. 8, 1885.

WITNESSES:
Otto Beyer
C. Sedgwick

INVENTOR:
A. Fisher
BY Munn & Co
ATTORNEYS.

UNITED STATES PATENT OFFICE.

ALFRED FISHER, OF EDWARDS, MISSISSIPPI.

NUT-LOCK.

SPECIFICATION forming part of Letters Patent No. 325,829, dated September 8, 1885.

Application filed June 28, 1884. (Model.)

*To all whom it may concern:*

Be it known that I, ALFRED FISHER, of Edwards, in the county of Hinds and State of Mississippi, have invented a new and Improved Nut-Lock, of which the following is a full, clear, and exact description.

The object of my invention is to provide a simple, efficient, and inexpensive nut-lock for use on railway-rail joints and elsewhere, to prevent loosening of the nuts and insure tight and durable fastenings.

The invention consists in a nut-lock formed of a nut adapted to screw on a bolt and having a plane-sided stud or projection on its back, and a lock-plate having a slot enlarged at one end to permit free turning of the nut-stud therein while screwing home the nut, and made of a size at the other end to lock around the stud when the lock-plate is driven forward, together with a dog adapted to act against the nut to prevent backward movement of the lock-plate, and having a shoulder or projection to enter the slot of the plate, all as hereinafter fully described and claimed.

Reference is to be had to the accompanying drawings, forming part of this specification, in which similar letters of reference indicate corresponding parts in all the figures.

Figure 1:
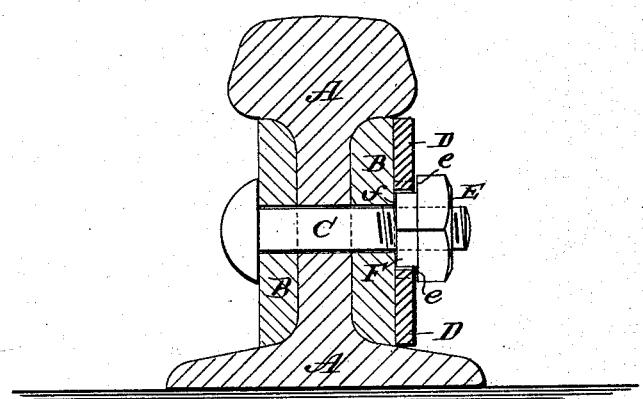
Figure 2:
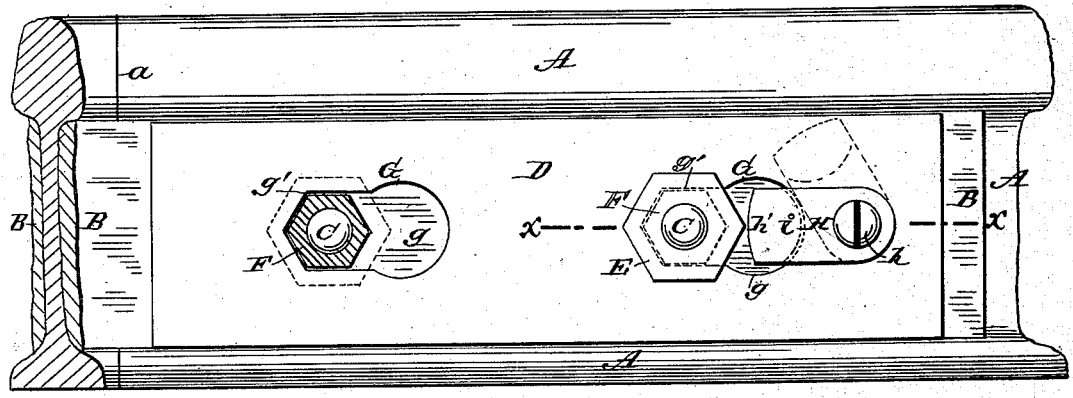
Figure 3:
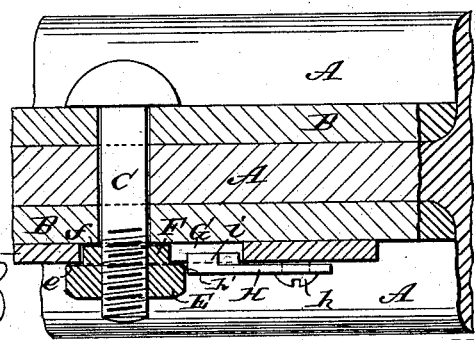

Figure 1 is a cross-sectional elevation of a railroad-rail, fish-plates, and bolt with my improved nut-lock applied. Fig. 2 is a side elevation, partly in section; and Fig. 3 is a sectional plan view taken on the line $x$ $x$, Fig. 2.

I will describe my invention with special reference to its use in locking the nuts of railway-rail joints; but it is adapted to serve equally well in many other situations or applications.

The letter A indicates a railway-rail; $a$, the joint between two of the rails; B B, the fish-plates, placed, as usual, one at each side of the rails; and C C indicate the two bolts usually employed to fasten the opposite fish-plates, B, to each rail A.

D is a lock-plate, which may, if desired, be long enough to lock all four of the nuts E on their corresponding bolts, C, at the rail-joint; but I prefer to employ a plate, D, to lock the two bolts C C at each side of the joint $a$, as shown.

The nuts E are formed with the plane-sided extension stud or projection F at the back, and the plate D has punched or otherwise formed in it the slots or openings G, one for each bolt C and nut E. These slots G are enlarged at one end, as at $g$, and these parts $g$ of the slots are made preferably in circular form, and are of a diameter slightly larger than the longest diameter of the stud F on the nut E, so that said stud may freely turn in this part $g$ of the slot. The other end part, $g'$, of the slot G corresponds in width with the short diameter of the stud F on the nut E, so that when the nut-stud lies in this part $g'$ of the slot the nut cannot turn back on the bolt.

H is a locking-dog, which is pivoted on a pin or screw, $h$, to the lock-plate D, on which pivot $h$ the dog may be turned over clear of the slot G or nut E, or may be turned to carry its end $h'$ opposite the nut E to prevent sliding of the plate D. The dog H has a projection or shoulder, $i$, on its under side next its outer end, said shoulder being adapted to spring into and lock with the end of the slot G when the dog is in position to hold the plate D against endwise movement.

The operation is as follows: After the bolts C are passed through the rail A and fish-plates B B the lock-plate D is laid againt a fish-plate with the larger portions $g$ of its slots G centered around the bolts and the dog H clear of the adjacent slot G. The nuts E are now screwed upon the bolts, the parts $g$ of the slots permitting the faces $f$ of the studs F of the nuts to be screwed up tightly against the fish-plate to bind the rail-joint securely. The lock-plate D is thinner than the length of the studs F, so that when the faces $f$ of the studs bind on the fish-plate B the lock-plate D will be free to slide along the fish-plate beneath the shoulders $e$ of the nuts E. The nuts having been turned home, and so that two opposite flat side faces or edges of the studs F will lie parallel with the opposite edges of the parts $g$ of the slots G, the lock-plate D is now slid forward by the hand or driven forward by a blow of a hammer to lock the parts $g$ of the slots around the studs or projections F of the nuts E, whereupon the dog H is brought down or in front of the adjacent nut E, to prevent the plate D from slipping backward, which completes the lock. The shoulder or projection $i$ holds the dog H in place.

It is evident that my improved nut-lock permits an effective tightening of the fish-plates on the rails, and at the same time leaves the plate D free to easily be moved endwise to lock around the tightened nuts.

I prefer to shape the ends of the parts $g$ of the slots G to fit snugly against the two adjacent plane sides of the nuts, and so that the slots shall lock around four sides of the nuts, as shown; but a lock at two opposite sides is sufficient.

Having thus described my invention, I claim as new and desire to secure by Letters Patent—

In a nut-lock, the combination, with the bolt C and the nut E, provided with the projection F on its inner face, of the locking-plate D, provided with the slot G, having the enlarged portion $g$ and the contracted portion $g'$, and the dog H, pivoted to the said locking-plate and provided with the projection $i$ on its inner face, adapted to enter the portion $g$ of the slot G when the dog is in position to hold the locking-plate, substantially as herein shown and described.

ALFRED FISHER.

Witnesses:
CHAS. SLOCOMB,
H. W. DAVIS.